# 2,958,692
5-CARBOXYMETHYLMERCAPTO-6-AMINOURACILS

Elmer F. Schroeder, Chicago, Ill., assignor to G. D. Searle & Co., Chicago, Ill., a corporation of Delaware No Drawing. Filed May 1, 1959, Ser. No. 810,242

8 Claims. (Cl. 260—256.5)

This invention relates to 5-carboxymethylmercapto-6-aminouracils of the following structure

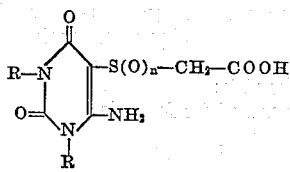

wherein R is a member of the group of radicals consisting of lower alkyl, lower alkenyl, and hydroxy(lower)alkyl; and $n$ is an integer from 0 to 2 inclusive.

The compounds of the invention are prepared from appropriately 1,3-disubstituted-5-halo-6-aminouracils by reacting the latter with thioglycolic acid or an ester thereof. The reaction is preferably carried out in alkaline solution at elevated temperatures, i.e. about 100° and for a period of time adequate for the reaction, i.e. from about one-half hour to about an hour. The alkaline metal hydroxides or alkaline earth hydroxides can be used to make the reaction medium alkaline. The product can be isolated by acidifying the reaction mixture, recovering the precipitated product and purifying the crude product thus obtained by redissolving it in aqueous alkaline solution and reprecipitating with acid.

The halogen present in the 5-halogenated uracils used as starting materials is preferably chlorine.

Other compounds of the invention in which the sulfur atom is oxidized to a sulfinyl or a sulfonyl group are obtained from the corresponding carboxymethylmercaptouracils by oxidation of the latter, for example, by use of a peroxyacid such as peroxyacetic acid, peroxybenzoic acid, trifluoroperoxyacetic acid and the like. The oxidation is carried out preferably in aqueous alkaline medium. After the oxidation step is completed, the reaction mixture is acidified with a mineral acid such as hydrochloric acid, sulfuric acid or the like, and the product which precipitates recovered. The product can be purified further by recrystallization from a suitable solvent such as water, ethyl acetate, alcohol and the like.

The compounds of this invention are useful as a result of their valuable pharmacological properties. They are, for example, anti-inflammatory agents as evidenced by their ability to inhibit the local edema formation associated with inflammatory states. They possess also bronchodilating activity.

The invention is described in greater detail in the examples which follow. These examples are presented by way of illustration and not of limitation. Quantities are expressed in parts by weight. Temperatures are expressed in degrees centigrade (° C.).

EXAMPLE 1

*1-propyl-3-ethyl-5-carboxymethylmercapto-6-aminouracil*

A solution of 6.07 parts of thioglycolic acid in 25 parts of water, previously adjusted to pH 7 with sodium hydroxide, is added to a suspension of 13.9 parts of 1-n-propyl-3-ethyl-5-chloro-6-aminouracil in a solution of 2.4 parts of sodium hydroxide in 35 parts of water. The resulting mixture is heated at 100° for 30 minutes during which time complete solution takes place. The reaction mixture is acidified with dilute hydrochloric acid and cooled. The oily precipitate which separates is stirred and allowed to stand until solidified. It is then collected by filtration and washed with water. Further purification is effected by dissolution in 125 parts of water containing 2.5 parts of sodium hydroxide, decolorization with activated carbon, and acidification with hydrochloric acid. The solid which separates is collected on a filter, washed with water, and dried at 80° to yield 1-propyl-3-ethyl-5-carboxymethylmercapto-6-aminouracil melting at 182–184°.

EXAMPLE 2

*1,3-dimethyl-5-carboxymethylmercapto-6-aminouracil*

A solution of 6.07 parts of thioglycolic acid in 25 parts of water, which has been neutralized with sodium hydroxide, is added to a suspension of 11.37 parts of 1,3-dimethyl-5-chloro-6-aminouracil in a solution of 2.4 parts of sodium hydroxide in 35 parts of water and the mixture heated for 30 minutes at 100°, during which time complete solution occurs. After cooling and acidifying with a slight excess of dilute hydrochloric acid, the crystals which appear are recovered by filtration, washed with water and dried to yield 1,3-dimethyl-5-carboxymethylmercapto-6-aminouracil as colorless crystals melting at 218–220° with effervescence. The product is readily soluble in dilute aqueous sodium hydroxide.

EXAMPLE 3

*1-allyl-3-ethyl-5carboxymethylmercapto-6-aminouracil*

A suspension of 18.37 parts of 1-allyl-3-ethyl-5-chloro-6-aminouracil in a solution of 3.2 parts of sodium hydroxide and 50 parts of water is treated with a solution of 8.1 parts of thioglycolic acid in 25 parts of water which has been previously neutralized with sodium hydroxide. The reaction mixture is heated for one hour at 100° during which time complete solution takes place. The reaction mixture is diluted with 75 parts of water, made acid with hydrochloric acid and the precipitate which forms recovered by filtration. The precipitate is washed with water and purified by dissolution in 200 parts of water containing 4 parts of sodium hydroxide, decolorization with activated carbon and acidification with hydrochloric acid. A crystalline precipitate forms which is recovered by filtration, washed and dried at 80° to yield 1-allyl-3-ethyl-5-carboxymethylmercapto-6-aminouracil, M.P. 176–177°.

Substitution of an equal amount of 1 methallyl-3-methyl-5-chloro-6-aminouracil for the 1-allyl-3-ethyl-5-chloro-6-aminouracil used in the foregoing procedure yields 1-methallyl-3-methyl-5-carboxymethylmercapto-6-aminouracil.

EXAMPLE 4

*1,3-di-n-butyl-5-carboxymethylmercapto-6-aminouracil*

A solution of 8.1 parts of thioglycolic acid in 35 parts of water, previously neutralized with sodium hydroxide, is added to a suspension of 21.9 parts of 1.3-di-n-butyl-5-chloro-6-aminouracil in 50 parts of water containing 3.2 parts of sodium hydroxide. The reaction mixture is heated at 100° for one hour, cooled, made acid with a slight excess of hydrochloric acid, and the oily precipitate which forms stirred and allowed to stand until solidified. The solid thus obtained is recovered by filtration, washed with water and purified by dissolution in 200 parts of water containing 4 parts of sodium hydroxide. The alkaline solution is decolorized with activated carbon, filtered and acidified with hydrochloric acid. The oily precipitate is stirred and chilled to induce crystallization, triturated with water and dried at 80° to yield 1,3-di-n-butyl-5-carboxymethylmercapto-6-aminouracil which melts at 157–159° with prior softening at 155°.

EXAMPLE 5

*1-(2-hydroxyethyl)-3-ethyl-5-carboxymethylmercapto-6-aminouracil*

A suspension of 14 parts of 1-(2-hydroxyethyl)-3-ethyl-5-chloro-6-aminouracil in 35 parts of water containing 2.4 parts of sodium hydroxide is treated with a solution of 6 parts of thioglycolic acid in 15 parts of water which has been previously neutralized with sodium hydroxide. The reaction mixture is heated at 100° for one hour, cooled, made acid with hydrochloric acid and chilled for several hours. The crystalline material thus obtained is recovered by filtration, washed with water and recrystallized from water solution to yield 1-(2-hydroxyethyl)-3-ethyl-5-carboxymethylmercapto-6-aminouracil which melts at 206–207°.

Substitution of 14 parts of 1-(3-hydroxypropyl)-3-methyl-5-chloro-6-aminouracil for the hydroxyethyl derivative as a starting material in the foregoing procedure yields 1-(3-hydroxypropyl)-3-methyl-5-carboxymethylmercapto-6-aminouracil.

EXAMPLE 6

*1-n-propyl-3-ethyl-5-carboxymethylsulfinyl-6-aminouracil*

To a cold solution of 14.53 parts of 1-n-propyl-3-ethyl-5-carboxymethylmercapto-6-aminouracil and 7 parts of sodium hydroxide in 100 parts of water is added 59.3 parts of a cold solution prepared by dilution of 9.3 parts of 40% peracetic acid in glacial acetic acid with 50 parts of water. The reaction mixture is allowed to stand for 15 minutes, filtered, and made acid by addition of 25 parts of concentrated hydrochloric acid. The acidified mixture is chilled and the crystals which separate are filtered off, washed with water, dried and recrystallized from ethyl acetate to yield 1-n-propyl-3-ethyl-5-carboxymethylsulfinyl-6-aminouracil as colorless crystals which melt at 146–147° (with decomposition).

EXAMPLE 7

*1-n-propyl-3-ethyl-5-carboxymethylsulfonyl-6-aminouracil*

A cold solution of 41.4 parts of 40% peracetic acid in glacial acetic acid diluted with 150 parts of water is added to a cold solution of 27.4 parts of 1-n-propyl-3-ethyl-5-carboxymethylmercapto-6-aminouracil in 250 parts of water containing 24 parts of sodium hydroxide. The reaction mixture is allowed to stand an additional 30 minutes after completion of the addition and then is made strongly acid with 47.2 parts of concentrated hydrochloric acid. On cooling a precipitate forms which is recovered by filtration and washed with water. Further purification is effected by dissolution in 250 parts of water containing 4 parts of sodium hydroxide, decolorization with activated carbon and acidification with 12 parts of concentrated hydrochloric acid. The voluminous precipitate which forms is filtered off, washed with water and dried to yield 1-n-propyl-3-ethyl-5-carboxymethylsulfonyl-6-aminouracil which melts at 207–208°.

What is claimed is:

1. A compound of the formula

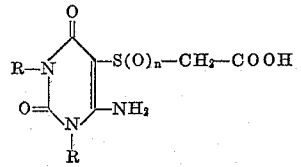

wherein R is a member of the group of radicals consisting of lower alkyl, lower alkenyl, and hydroxy(lower)alkyl, and $n$ is an integer from 0 to 2 inclusive.

2. 1-n-propyl-3-ethyl-5-carboxymethylmercapto-6-aminouracil.

3. 1,3-dimethyl-5-carboxymethylmercapto-6-aminouracil.

4. 1-allyl-3-ethyl-5-carboxymethylmercapto-6-aminouracil.

5. 1,3-di-n-butyl-5-carboxymethylmercapto-6-aminouracil.

6. 1-(2-hydroxyethyl)-3-ethyl-5-carboxymethylmercapto-6-aminouracil.

7. 1-n-propyl-3-ethyl-5-carboxymethylsulfinyl-6-aminouracil.

8. 1-n-propyl-3-ethyl-5-carboxymethylsulfonyl-6-amino uracil.

No references cited.